UNITED STATES PATENT OFFICE.

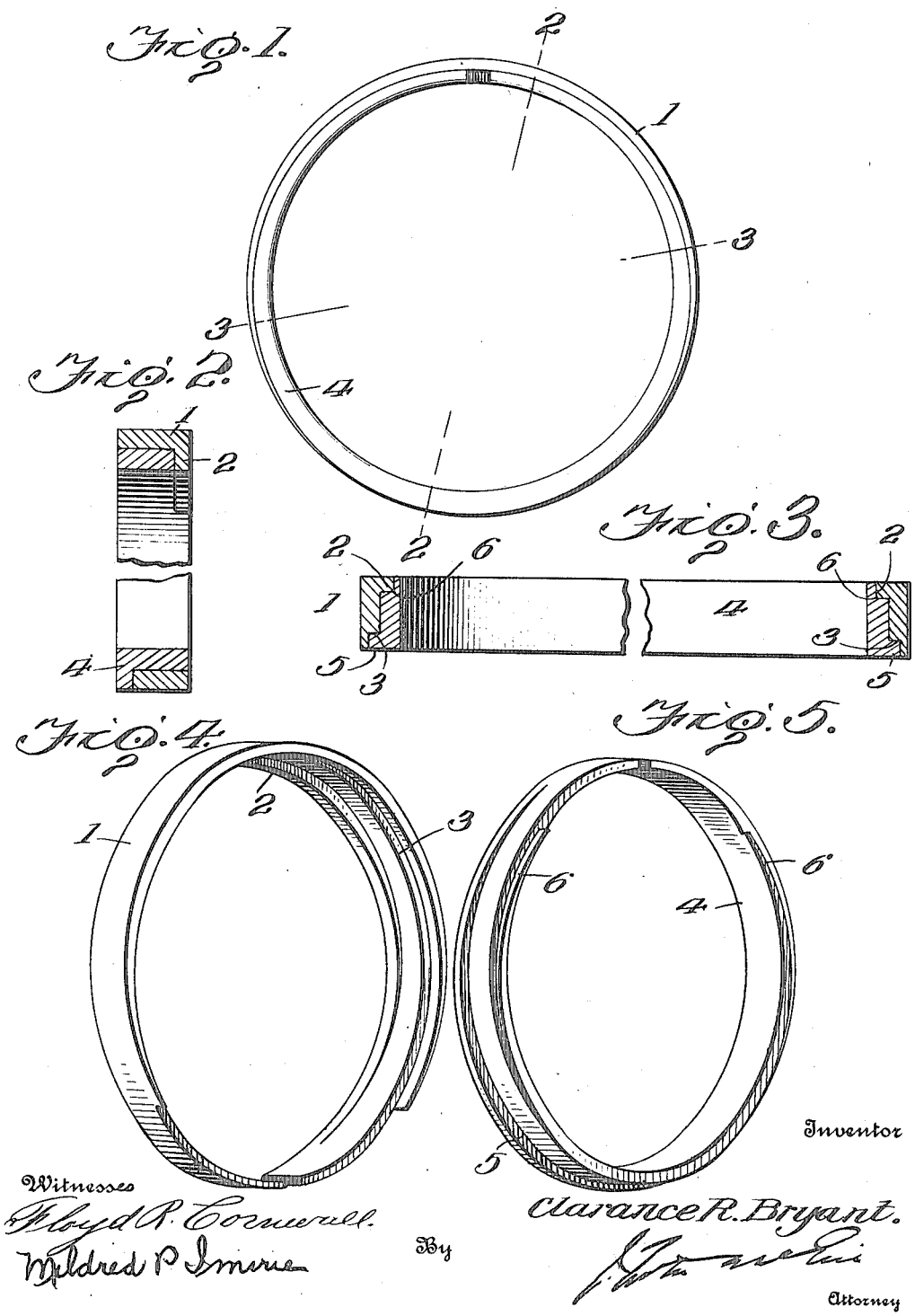

CLARANCE R. BRYANT, OF MEMPHIS, TENNESSEE, ASSIGNOR, BY MESNE ASSIGNMENTS, TO CONTINENTAL PISTON RING COMPANY, OF MEMPHIS, TENNESSEE, A CORPORATION OF TENNESSEE.

PISTON PACKING-RING.

1,180,971. Specification of Letters Patent. Patented Apr. 25, 1916.

Application filed May 25, 1915. Serial No. 30,293.

*To all whom it may concern:*

Be it known that I, CLARANCE R. BRYANT, of Memphis, in the county of Shelby and State of Tennessee, have invented certain new and useful Improvements in Piston Packing-Rings; and I do hereby declare the following to be a full, clear, and exact description of the invention, such as will enable others skilled in the art to which it appertains to make and use the same.

The object of this invention is to provide a packing ring composed of split members, the ends of which members will be out of line with each other and which members are capable of being secured together without the necessity of expanding or contracting.

In the accompanying drawings, Figure 1 is an elevation. Fig. 2 is a section on line 2—2, Fig. 1. Fig. 3 is a section on line 3—3, Fig. 1. Figs. 4 and 5 are views of the outer and inner rings, respectively.

Referring to the drawings, 1 designates the outer split member which is formed on its inner surface with an eccentric flange 2, the maximum depth of which is diametrically opposite the split ends, the ends of such flange tapering off and becoming flush short of the ends of such split members. In this same member are formed eccentric grooves 3 which are of greatest depth at or near the split ends, while they gradually taper off flush with the surface of the inner member at a point diametrically opposite such split ends. The inner member 4 has a formation the counter-part of that of the outer member. In other words, in addition to being split, it has a circumferential eccentric flange 5 of a maximum depth diametrically opposite the split ends, and which flange is designed to fit in the grooves 3 of the outer member. This inner member also has, along its other edge eccentric grooves 6, their maximum depth being adjacent to or toward the split ends. These grooves are gradually tapered off flush with the main body of the inner member. They are designed to receive the eccentric flange 2 of the outer member. The two members may readily and easily be secured together by mere lateral movement of one relatively to the other but without the necessity of either expanding the outer member or contracting the inner one. The split ends of the two members are substantially diametrically opposite each other and when so arranged a perfect ring is presented, the split ends of one ring lying against the flange of the other.

It will be seen that a packing ring having the characteristics herein described is exceedingly simple in construction and may be manufactured without great difficulty.

I claim as my invention:

A packing ring comprising inner and outer split members, each of said members having an eccentric flange at one side and grooves in the opposite side, the grooved side of one member fitting against the flanged side of the other member, said grooves accommodating the ends of said flanges.

In testimony whereof, I have signed this specification in the presence of two subscribing witnesses.

CLARANCE R. BRYANT.

Witnesses:
 MILDRED P. IMIRIE,
 FRANCIS S. MAGUIRE.